3,288,680
Patented Nov. 29, 1966

3,288,680
STABILIZED *CLOSTRIDIUM PERFRINGENS*
β-TOXOID VACCINE
Max Sterne, London, England, assignor to Burroughs Wellcome & Co. (U.S.A.) Inc., Tuckahoe, N.Y., a corporation of New York
No Drawing. Filed Oct. 12, 1962, Ser. No. 230,263
Claims priority, application Great Britain, Nov. 23, 1959, 39,743/59
1 Claim. (Cl. 167—78)

This invention relates to clostridial vaccines and their manufacture.

This application is a continuation-in-part of my prior copending applications, Serial Numbers 70,931 and 70,934, both filed November 22, 1960, and now abandoned.

Among the causative organisms of enterotoxaemia in lambs and sheep and occasionally in other animals, for example calves and foals, are the strains of *Clostridium perfringens* (*Cl. welchii*) that produce β- or ε-toxin. For example *Cl. perfringens* type B (producing both β- and ε-toxins) causes an enterotoxaemia in lambs (lamb dysentery), and *Cl. perfringens* type C (producing β-toxin) and *Cl. perfringens* type D (producing ε-toxin) cause enterotoxaemias in adult sheep and other animals. Lambs may be protected against lamb dysentery, which affects lambs under ten days old and usually causes death after a short illness, by immunising the ewe with a vaccine containing toxoids derived from the toxins of *Cl. perfringens* type B; the ewe responds to the toxoids by making specific antitoxins that are passed to the lamb in the colostrum. Similarly, sheep and other animals may be protected against β- and ε-toxin enterotoxaemias, resulting from the growth of *Cl. perfringens* strains, by immunisation with vaccines containing β- and ε-toxoids.

To make these vaccines, the toxins in the *Cl. perfringens* culture medium are converted into toxoids by the additions of formaldehyde, in slight excess to ensure complete conversion. The vaccine may be a formol-culture; that is, a whole culture in which the bacteria have been killed and the toxins converted into toxoids by the addition of formaldehyde. Alternatively, the bacteria may be removed by filtration or otherwise either before or after the addition of formaldehyde, giving a cell-free vaccine. The vaccine is customarily subjected to some form of treatment with an adjuvant, such as alum, to improve its immunising power. A preservative, customarily phenol or a similar antiseptic, is added to the vaccine in order to prevent the growth of contaminating microorganisms. The pH is customarily maintained at about 7.0. The vaccine is finally filled into suitable containers, subsequently sealed, from which the immunising doses may be taken.

Lambs born of unvaccinated ewes may be protected from lamb dysentery by injection soon after birth with lamb dysentery antiserum. The antiserum contains specific antioxins, and is prepared from the blood of horses that have been hyperimmunised with a preparation β-toxin and other toxins of *Cl. perfringens*. The toxin preparations for hyperimmunising horses may be prepared as described above for the toxoid preparations, but with the omission of the treatment with formaldehyde.

Vaccines for immunisation against other clostridial diseases can be prepared similarly by treating cultures or culture filtrates of the causative clostridium species with formaldehyde to give preparations of the corresponding toxoids. For example, sheep may be protected against braxy by immunisation with *Cl. septicum* toxoid, against blackleg by immunisation with *Cl. chauvoei* toxoid, against black disease by immunisation with *Cl. oedematiens* toxoid and from tetanus by immunisation with *Cl. tetani* toxoid. Cattle are also susceptible to clostridial disease, for example enterotoxaemia due to *Cl. perfringens* type C, infections with *Cl. chauvoei* and *Cl. septicum* and intoxication with *Cl. botulinum* and they may be satisfactorily immunised against these diseases by vaccines containing *Cl. perfringens* β-toxoid and the other respective toxoids.

It is very desirable to be able to immunise against several clostridial diseases in one operation by using a combined vaccine containing several clostridial toxoids. Such a vaccine might be made by mixing individual toxoid preparations, but in order to obtain the mixture in an acceptably small volume the individual toxoid preparations would have to be of very high potency. This requirement becomes more stringent the greater the number of different toxoids to be included in the combined vaccine.

In comparison with that of the other clostridial toxoids and toxins, the stability of *Cl. perfringens* β-toxoid and β-toxin is not good, owing to a progressive destruction of the immunising antigens. This relative instability of the *Cl. perfringens* β-toxoid is a serious obstacle to the inclusion of the toxoid in a combined clostridial vaccine.

It has now been found that under sterile conditions the rate of loss of potency of the *Cl. perfringens* β-toxoid is less in the absence than in the presence of an antiseptic of the class including phenol, o-cresol, p-chloro-m-cresol and benzyl alcohol. On the other hand, it has been found that if a vaccine containing the *Cl. perfringens* β-toxoid is treated with organic mercurial antiseptics, such as sodium o-ethylmercurithiobenzoate (thiomersal) or a phenylmercuric salt, not only is any growth of contaminants prevented but the *Cl. perfringens* β-toxoid is stabilised or preserved.

It has also been found that the rate of loss of potency of the *Cl. perfringens* β-toxoid or β-toxin can be considerably reduced if the pH of the toxoid or toxin preparation, after the addition of preservative and any desired adjuvant, is brought within the limits 5.7–6.3 by the addition of acid or alkali as required. The preparation is then filled into subsequently sealed containers.

This invention provides a combined clostridial vaccine containing *Cl. perfringens* β-toxoid together with other clostridial toxoids, in sealed containers, having a pH value between 5.7 and 6.3, and stabilised and preserved by the inclusion of an organic mercurial antiseptic.

The following examples illustrate the invention.

*Example 1*

An aliquot containing *Cl. perfringens* β-toxin with β-antitoxin combined power of 143 unit equivalents/ml. was adjusted to pH 6.2 by the addition of sodium hydroxide and filled into a subsequently sealed container.

After 28 days at 37° C., the β-antitoxin combining power of this β-toxin preparation had fallen to 65 unit equivalents/ml. In two similar aliquots of β-toxin, treated in the same way but adjusted to pH 6.6 and 7.0 respectively, the β-antitoxin combining power had fallen from 143 unit equivalents/ml. to 32 and 11 unit equivalents/ml. respectively.

*Example 2*

A formol culture of *Cl. perfringens* type B after treatment with alum was brought to pH 5.9 by the addition of 10 N-sodium hydroxide and filled into subsequently sealed containers.

A formol-culture of *Cl. perfringens* type C was similarly treated.

Cell-free vaccines derived from *Cl. perfringens* types C and D were similarly treated.

The vaccines described in Example 2 possessed similarly improved stability.

Example 3

Formol-culture of two strains of *Clostridium perfringens* type B containing 0.4% w./v. sodium metabisulphite were treated
(a) With 1 part in 100 by volume of 50% w./v. phenol in ether,
(b) With 1 part in 1000 by volume of 10% w./v. aqueous sodium o-ethylmercurithiobenzoate, or
(c) With 3 parts in 100 by volume of 0.2% w./v. aqueous phenylmercuric nitrate. The losses in the total β-antitoxin combining power in the treated cultures and untreated controls on exposure at pH 5.7–6.3 at 37° C. for 34 days are given in the table.

| Treatment | Loss of potency, percent | |
|---|---|---|
| | Strain (i) | Strain (ii) |
| (a) | 80 | 78 |
| (b) | 18 | 37 |
| (c) | 18 | 39 |
| Control | 44 | 59 |

Example 4

Similarly, formol-cultures and cell-free vaccines derived from *Cl. perfringens* type C were treated with sodium o-ethylmercurithiobenzoate or with phenylmercuric nitrate. These vaccines possessed similarly improved stability.

Example 5

A vaccine for protecting sheep against lamb dysentery, struck and pulpy kidney (*Cl. perfringens* enterotoxaemias due to types B, C and D respectively) contains β-toxoid derived from *Cl. perfringens* types B and C and ε-toxoid derived from *Cl. perfringens* types B and D. The vaccine was prepared by mixing formol cultures of *Cl. perfringens* type B and type C and a cell-free vaccine (formol toxoid) derived from *Cl. perfringens* type D and diluting appropriately. Potash alum was added and the pH was adjusted to 5.9 at which the stability of the β-toxoid component of the vaccine is optimal. The concentration of thiomersal in the combined vaccine was brought to 1 part in 10,000. The vaccine was filled into containers which were subsequently sealed.

Example 6

A seven-component combined vaccine for protecting sheep against clostridial diseases was prepared by mixing formol cultures of *Cl. perfringens* type B and type C, *Cl. chauvoei*, and *Cl. oedamatiens* type B, and cell-free vaccines (formol toxoids) derived from *Cl. perfringens* type D, *Cl. septicum* and *Cl. tetani*. Potash alum was added. The pH was adjusted to 5.9, at which the stability of the *Cl. perfringens* β-toxoid component of the vaccine is optimal. Diluent was added when necessary and the concentration of thiomersal in the combined vaccine was brought to 1 part in 10,000. The vaccine was filled into containers which were subsequently sealed.

What I claim is:

A clostridial vaccine containing *Clostridium perfringens* β-toxoid having a pH value of about 5.7 to 6.3 and stabilized and preserved by the inclusion of an organic mercurial antiseptic.

References Cited by the Examiner

UNITED STATES PATENTS

| | | | |
|---|---|---|---|
| 2,065,196 | 12/1936 | Parfentjev | 167—78 |
| 2,528,972 | 11/1950 | Pillemer | 167—78 |
| 2,635,984 | 4/1953 | Eggert | 167—78 |
| 3,083,142 | 3/1963 | Howell et al. | 167—78 |

OTHER REFERENCES

British Veterinary Codex (1953), London, The Pharmaceutical Press, pp. 425–432, 437–444, 467–468, 476–477, 487, 493–494.

Jansen, B. C.: "The Beta Toxin of *Clostridium Welchii* Type B, Wilsdon, in Relation to the Production of a Vaccine Against Lamb Dysentery," Onderstepoort Jour. of Vet. Research, vol. 28, No. 4, pp. 495–522, 546–547, May 1961.

("VDE-5") Veterinary Drug Encyclopedia and Therapeutic Index, 5th edition, 1957, published by Drug Publications, Inc., New York, N.Y. Clostridum entries: pp. 40–41, 71–73, 126, 293; multiple bacterin entries: pp. 178–180, 209–210.

LEWIS GOTTS, *Primary Examiner.*

FRANK CACCIAPAGLIA, *Examiner.*

S. K. ROSE, *Assistant Examiner.*